(12) United States Patent
Ishihara

(10) Patent No.: US 6,889,929 B2
(45) Date of Patent: May 10, 2005

(54) RECORDING TAPE CARTRIDGE

(75) Inventor: Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/610,769

(22) Filed: Jul. 2, 2003

(65) Prior Publication Data

US 2004/0004147 A1 Jan. 8, 2004

(30) Foreign Application Priority Data

Jul. 3, 2002 (JP) ........................................ 2002-194683

(51) Int. Cl.⁷ .......................................... G11B 23/107
(52) U.S. Cl. ................................................... 242/348.2
(58) Field of Search ............................ 242/348, 348.1, 242/348.2, 348.3, 348.4; 360/132

(56) References Cited

U.S. PATENT DOCUMENTS

| | | | |
|---|---|---|---|
| 5,868,333 A | * | 2/1999 | Nayak ..................... 242/348.2 |
| 6,111,725 A | * | 8/2000 | Christie ...................... 360/132 |
| 6,349,892 B2 | | 2/2002 | Morita et al. |
| 6,581,865 B1 | * | 6/2003 | Zweighaft et al. .......... 242/348 |
| 6,739,539 B2 | * | 5/2004 | Hiraguchi et al. ....... 242/348.2 |

* cited by examiner

Primary Examiner—John M. Jillions
(74) Attorney, Agent, or Firm—Sughrue Mion, PLLC (57) ABSTRACT

A recording tape cartridge of the present invention includes a case, an opening aperture, a guide groove, and a covering member. The case is substantially rectangular and rotatably accommodates a single reel, onto which recording tape is wound. A corner portion of the case, at a front side in a direction of loading into a drive device, is cut away to form the opening aperture, which is for drawing out a leader member attached to an end portion of the recording tape. The guide groove is provided at an inner face of the case, and is inflected. The covering member is formed by a plurality of plate pieces which are joined by (a) hinge(s), and is guided by the guide groove. The covering member slides to open and close the opening aperture.

24 Claims, 8 Drawing Sheets

RECORDING TAPE CARTRIDGE

CROSS-REFERENCE TO RELATED APPLICATION

This application claims priority under 35 USC 119 from Japanese patent document, No. 2002-194683, the disclosure of which is incorporated by reference herein.

BACKGROUND OF THE INVENTION

1. Field of the Invention

The present invention relates to a recording tape cartridge which accommodates, in a case, a single reel onto which recording tape such as a magnetic tape or the like, principally for use as a recording/replaying medium for computers and the like, is wound.

2. Description of the Related Art

Conventionally, a magnetic tape cartridge at which a magnetic tape, which is used as a data recording/replaying medium for computers or the like, is wound onto a single reel and this reel is accommodated in a case has been well known. At a distal end of such a magnetic tape, a leader member, such as a leader pin, a leader tape, a leader block or the like is provided. Drawing-out means, which is provided at a drive device side, draws the leader member out through an opening aperture of the magnetic tape cartridge and winds the magnetic tape, which is fixed to the leader member, onto a drive device side winding reel.

A reel gear is provided in an annular form at a lower face center of the reel and exposed through an opening hole, which is formed in a lower face of the magnetic tape cartridge. A drive gear, which is provided at a drive device side rotation shaft, meshes with the reel gear. With this structure, the reel is driven to rotate. When the reel of the magnetic tape cartridge and the winding reel of the drive device are rotated at the same time, data can be recorded to the magnetic tape and/or data that has been recorded to the magnetic tape can be replayed.

Figure 6:
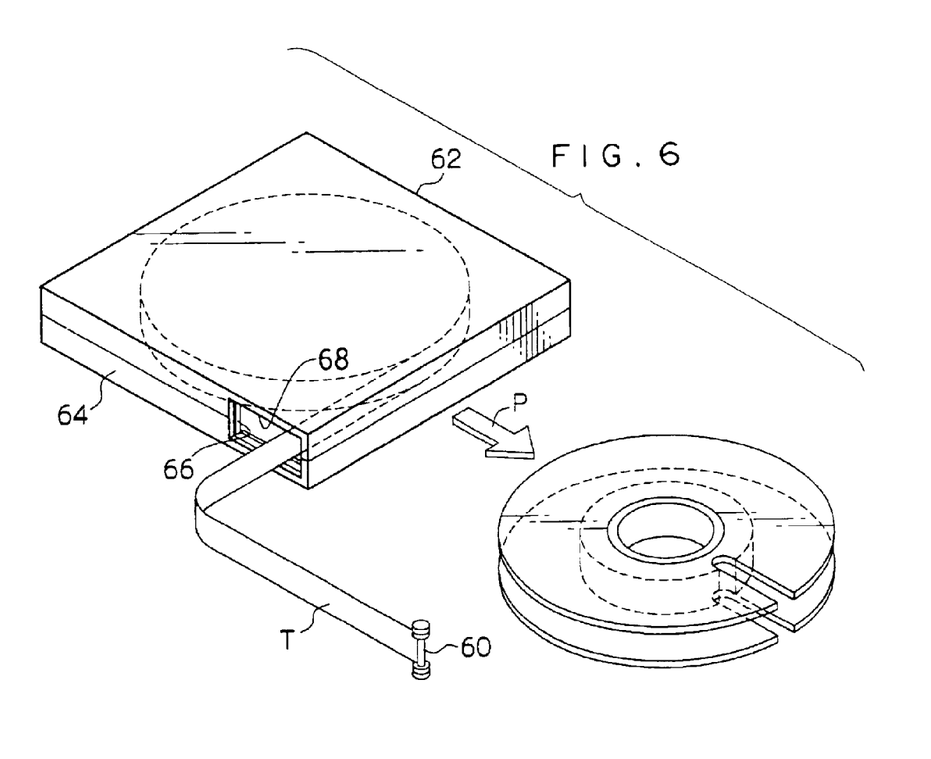
FIG. 6 is a schematic perspective view of a conventional magnetic tape cartridge provided with a leader pin.
Figure 7:
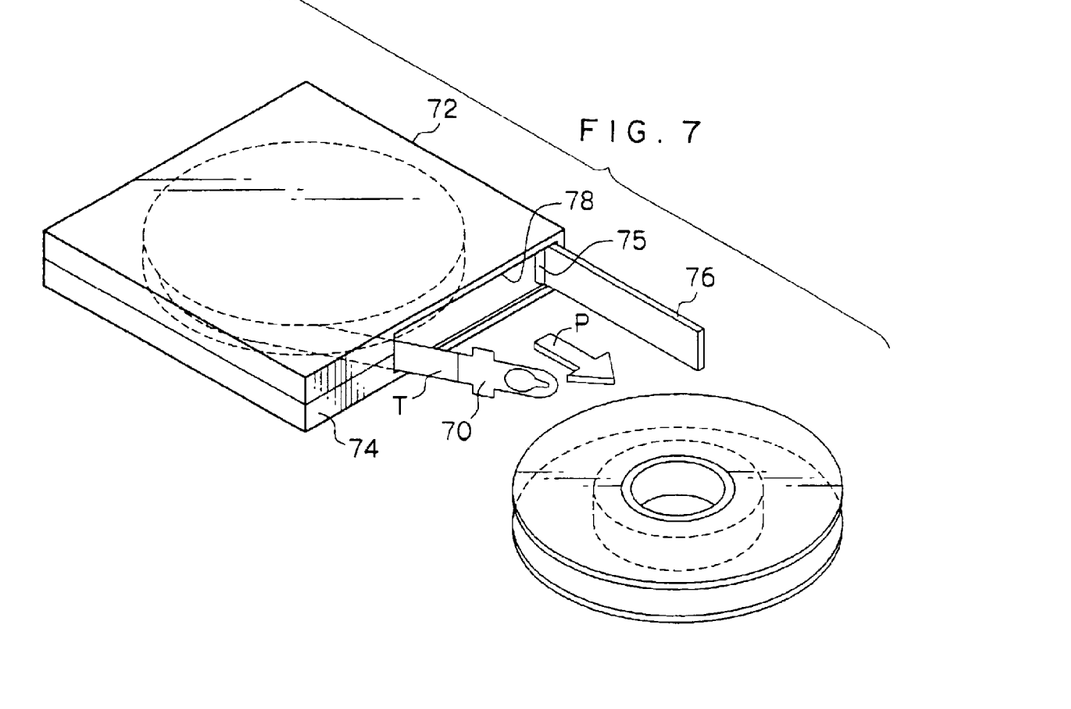
FIG. 7 is a schematic perspective view of a conventional magnetic tape cartridge provided with a leader tape.
Figure 8:
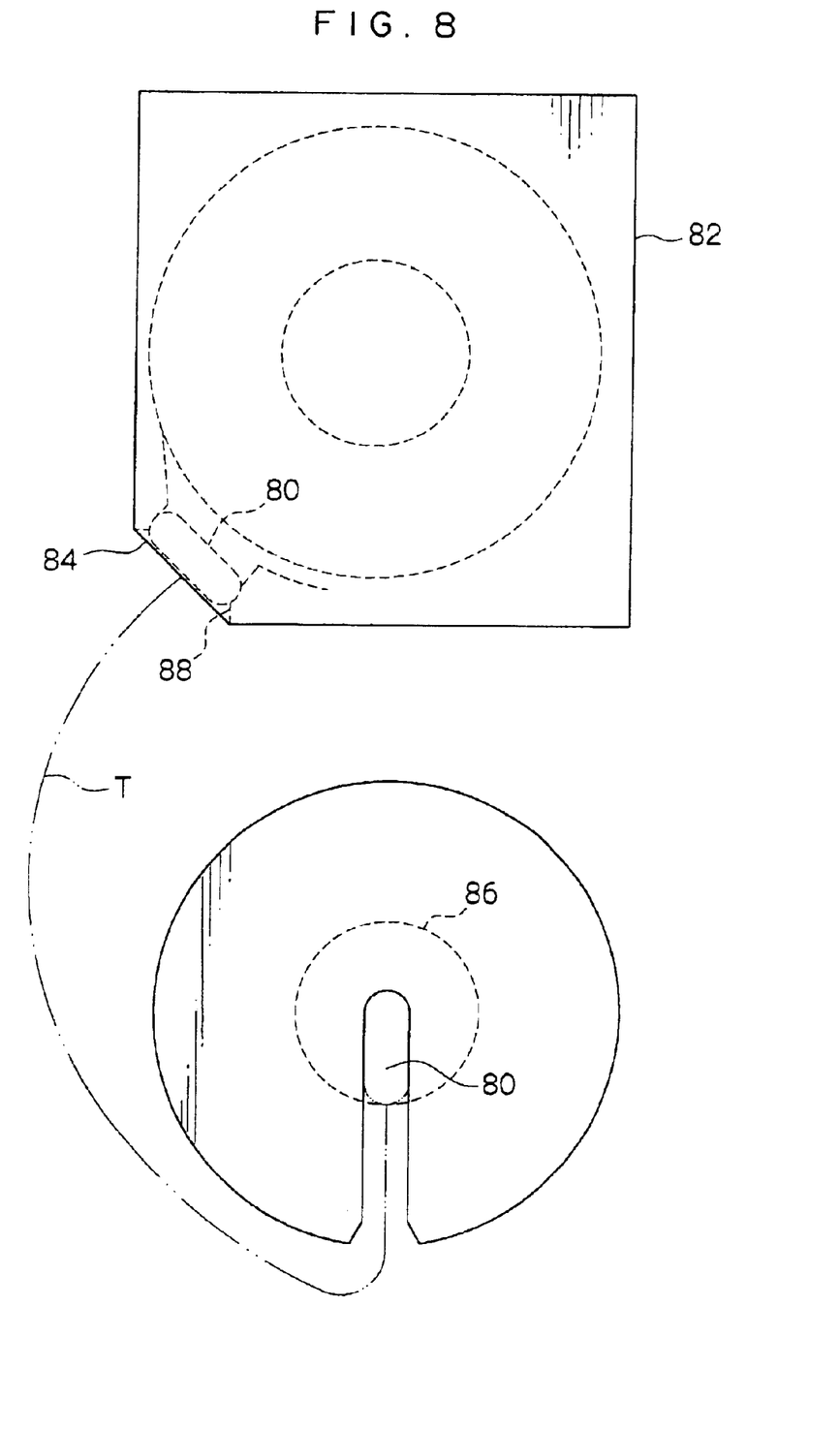
FIG. 8 is a schematic perspective view of a conventional magnetic tape cartridge provided with a leader block.

Such magnetic tape cartridges take up little space when stored and can record large amounts of information. As shown in FIGS. 6 to 8, a position of the opening aperture and a type of door that opens and closes the opening aperture are different for each type of leader member. Specifically, in the case of a leader pin 60, as shown in FIG. 6, an opening 68 is formed in a side wall 64 of a case 62, which wall is parallel with a direction of loading into the drive device (the direction of arrow P). This opening 68 is opened and closed by a door 66, which slidingly moves in a direction the same as the loading direction.

However, because the opening 68 is provided at the side wall 64 of the case 62 in this manner, it is necessary that the drive device side drawing-out means picks the leader pin 60 up from a sideward direction left or right of the case 62 when drawing out the leader pin 60. Therefore, a space for this "bypassing around" by the drawing-out means must be conserved at the drive device side. Moreover, a structure for the "bypassing around" by the drawing-out means is complicated, and leads to a disadvantageous increase in size of the drive device. In addition, there is a problem in that a drawing-out path of the magnetic tape T becomes long.

In the case of a leader tape 70, as shown in FIG. 7, an opening 78 is formed in a front wall 74 of a case 72, which wall intersects the direction of loading into the drive device (the direction of arrow P). A door 76, which opens and closes this opening 78, is a swivel-type door, which rotates forward about a support shaft 75, which is supported at a corner vicinity of the case 72. However, when the opening 78 is formed in the front wall 74 of the case 72 in this manner, although there is no requirement for the drive device side drawing-out means to bypass around, the door 76 opens outward by a large amount. Therefore, it is necessary to reserve space at the drive device side such that the door 76 will not be impeded when opening the opening 78. As a result, the drive device disadvantageously becomes larger.

In the case of a leader block 80, as shown in FIG. 8, an opening 88 is formed by cutting away a corner portion 84 at a front side in the drive device loading direction. The opening 88 is opened and closed directly by the leader block 80. When the leader block 80 opens and closes the opening 88 in this manner, there is a problem in that the leader block 80 is susceptible to the occurrence of damage and soiling. Specifically, because the leader block 80 engages at a drive device side reel hub 86 and structures a portion of the reel hub 86, even an amount of damage or soiling that would not be a problem if the leader block 80 was employed as a usual door might cause difficulty for engaging with the reel hub 86, and this may have a disadvantageous effect on running of the magnetic tape T.

In addition, the leader block 80 is anchored only at peripheral portions of the opening 88. Consequently, there is a problem that the leader block 80 detaches easily when the magnetic tape cartridge is dropped. Moreover, because the leader block 80 is larger in size than the leader pin 60, there is a problem in that there are many more constraints on the form of the case. As a result, types of the leader pin 60, which function separately from a door, have an advantage over the leader block 80, which is combined with the door.

SUMMARY OF THE INVENTION

In consideration of the circumstances described above, an object of the present invention is to provide a recording tape cartridge in which a door, which is for opening and closing an opening aperture, and a leader member, which is for drawing out of a recording tape, are separate members and the opening aperture is provided such that a drawing-out path of the recording tape is as short as possible, the door is provided as a sliding-type door which is capable of opening and closing the opening aperture in a small space, and a drive device can be designed to be small.

In order to achieve the object described above, a recording tape cartridge of the present invention includes: a substantially rectangular case rotatably accommodating a single reel on which recording tape is wound; an opening aperture for drawing out a leader member attached to an end portion of the recording tape, the opening aperture including a cut away portion at a corner portion, of the case, at a front side of the case in a direction of loading to a drive device; an inflected guide groove formed at an inner face of the case; and a covering member including a plurality of plate pieces which are guided along the guide groove and are hingedly coupled, the covering member sliding for opening and closing the opening aperture.

Thus, because the opening aperture is provided by cutting away the corner portion of the case at the front side thereof in the direction of loading the case into a drive device, it is possible for an opening face of this opening aperture to face in a direction of loading into the drive device. Consequently, it is possible for drive device side drawing-out means to enter from a frontward side, and a drawing-out path of the recording tape can be made as short as possible.

Therefore, a complex structure at the drive device, for drawing the magnetic tape out by a detour, is rendered unnecessary, and a compact drive device with low production costs can be designed. Moreover, because the recording tape runs along the shortest path, abrasion of the recording tape due to contact with tape guides can be reduced.

Because the opening aperture is provided at the corner portion, it is necessary for the covering member to slide at an angle with respect to the drive device loading direction, for opening and closing the opening aperture. Accordingly, the guide groove forms an inflected line shape which connects a groove along the opening aperture and a groove along the drive device loading direction. The covering member of the present invention is structured by a plurality of plate pieces connected with (a) hinge(s). Thus, the covering member can slide along the guide groove which is inflected in this manner, and the opening aperture provided at the corner portion can be opened and closed reliably.

DETAILED DESCRIPTION OF THE INVENTION

Herebelow, a recording tape cartridge 10 relating to an embodiment of the present invention will be described on the basis of FIGS. 1 to 5. For convenience of explanation, a loading direction of the recording tape cartridge 10 into a drive device is shown as arrow A, and is regarded as a forward direction (front side) of the recording tape cartridge 10. The direction of an arrow B intersecting arrow A is regarded as a rightward direction.

Figure 1:
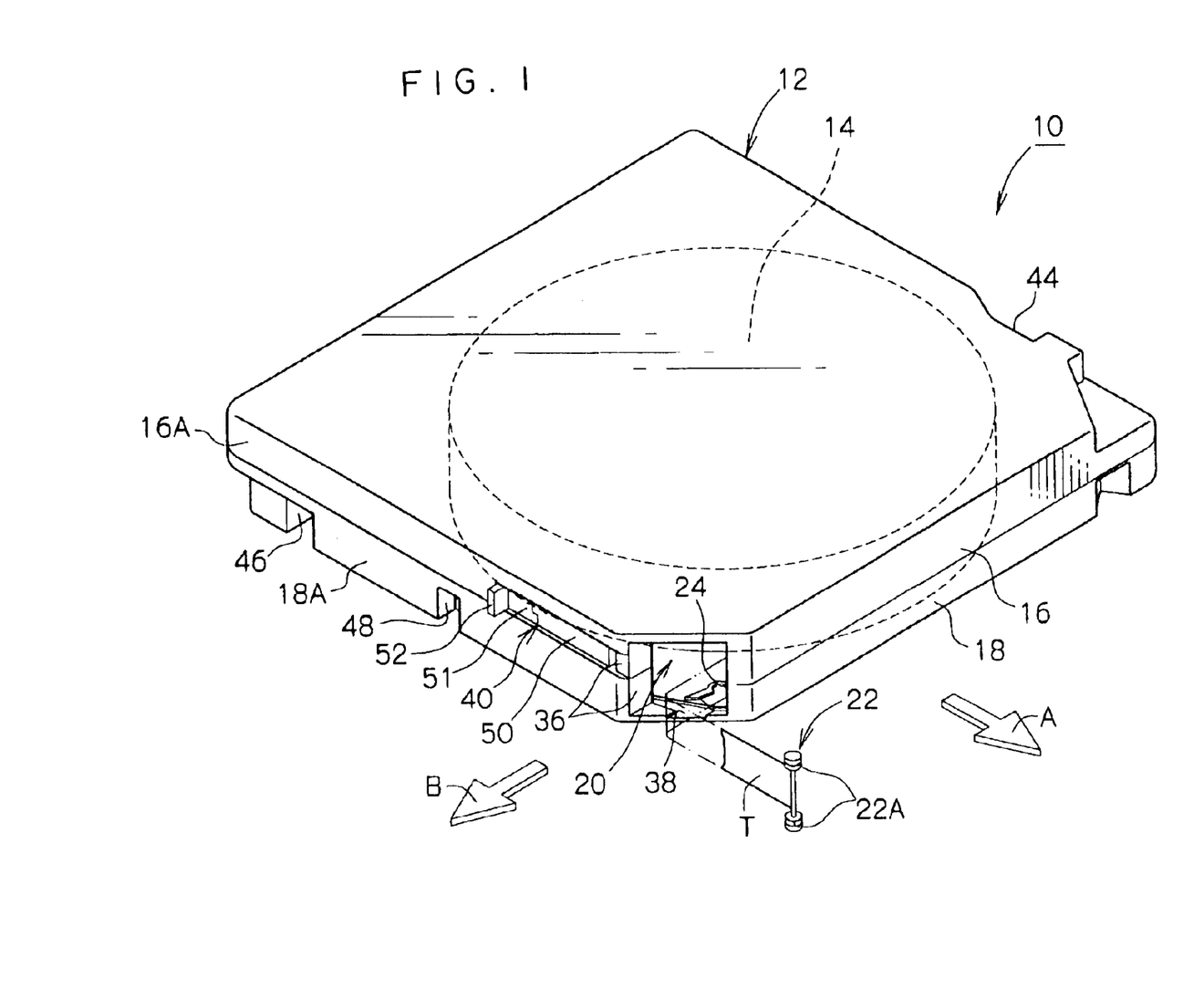
FIG. 1 is a schematic perspective view of a recording tape cartridge of the present invention.
Figure 2:
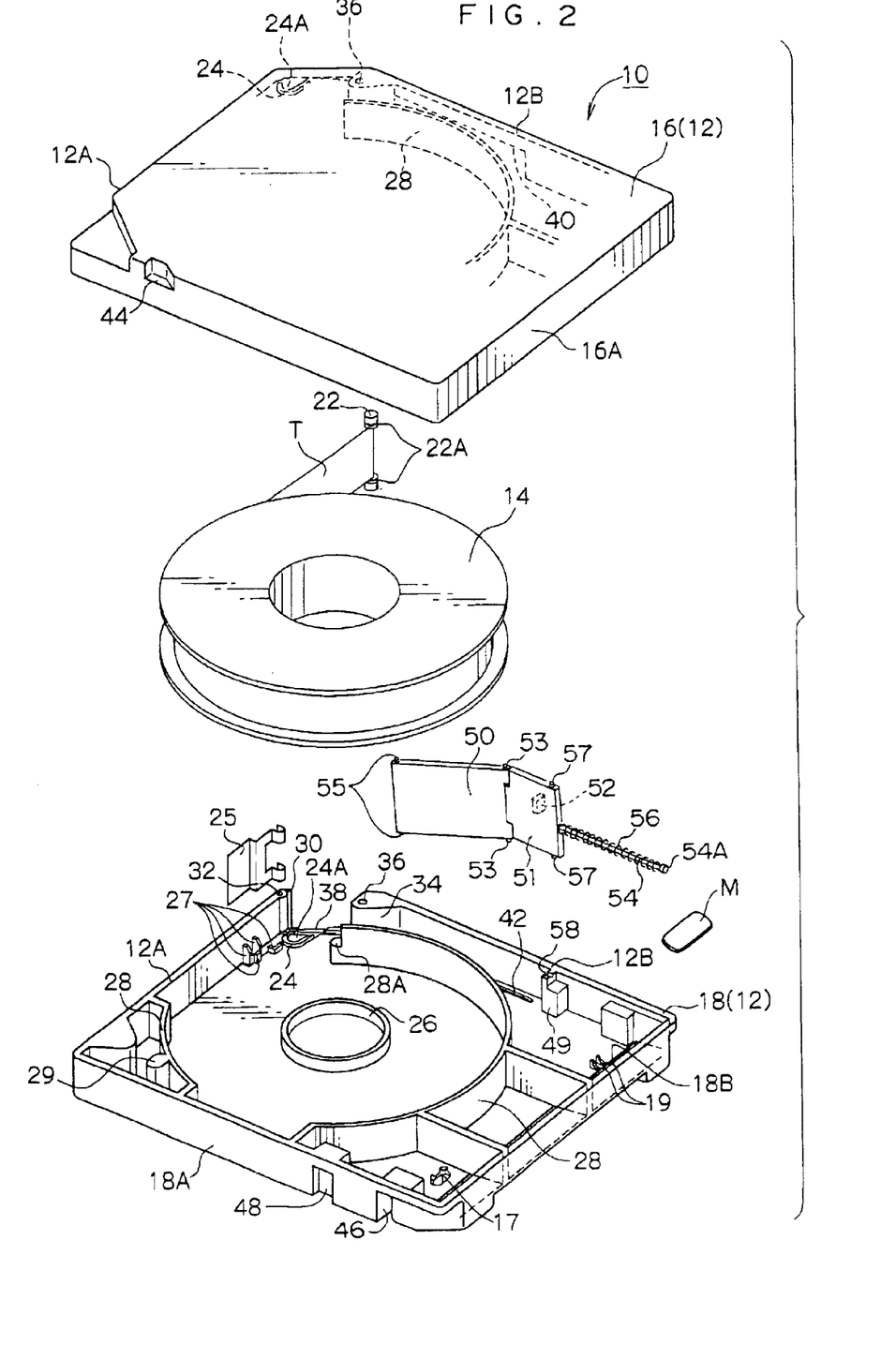
FIG. 2 is a schematic exploded perspective view of the recording tape cartridge of FIG. 1.

As shown in FIGS. 1 and 2, the recording tape cartridge 10 is structured to rotatably accommodate a single reel 14 in a case 12. The case 12 is substantially rectangular in plan view. A magnetic tape T is wound onto the reel 14. The magnetic tape T serves as a recording tape which is an information recording/replaying medium. The case 12 is structured by matching up and joining two peripheral walls 16A and 18A of an upper case 16 and a lower case 18 to one another. A front-right corner portion of each of the upper case 16 and the lower case 18, which is a single corner portion at a front end side in the direction of loading into the drive device, has a diagonally cut-away form. An accommodation space for the reel 14 onto which the magnetic tape T is wound is provided inside the case 12.

The cut-away corner portions of the peripheral walls 16A and 18A of the upper case 16 and the lower case 18 serve as an opening 20 for drawing out the magnetic tape T. A leader pin 22 is connected at a free end of the magnetic tape T, which is drawn out through the opening 20. The leader pin 22 is caught on (engaged) by drawing-out means of the drive device, and subjected to a drawing-out operation. At each of two end portions of the leader pin 22, which protrude beyond width direction end portions of the magnetic tape T, an annular groove 22A is formed. These annular grooves 22A are caught on by hooks or the like of the drawing-out means. Thus, with this structure, the hooks or the like do not contact and damage the magnetic tape T when the magnetic tape T is being drawn out.

Figure 3:
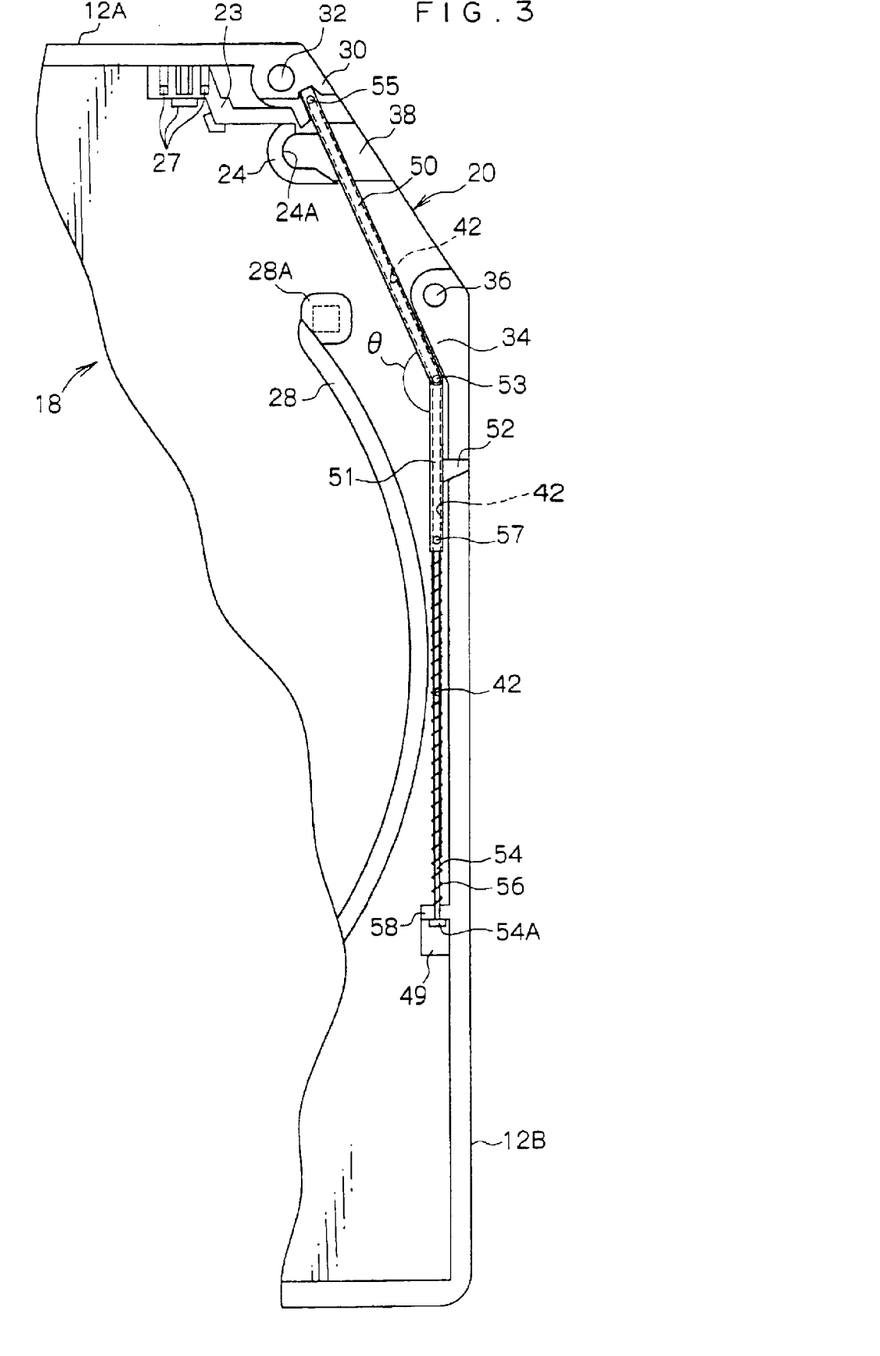
FIG. 3 is a schematic explanatory view showing a state when a door has closed an opening.
Figure 4:
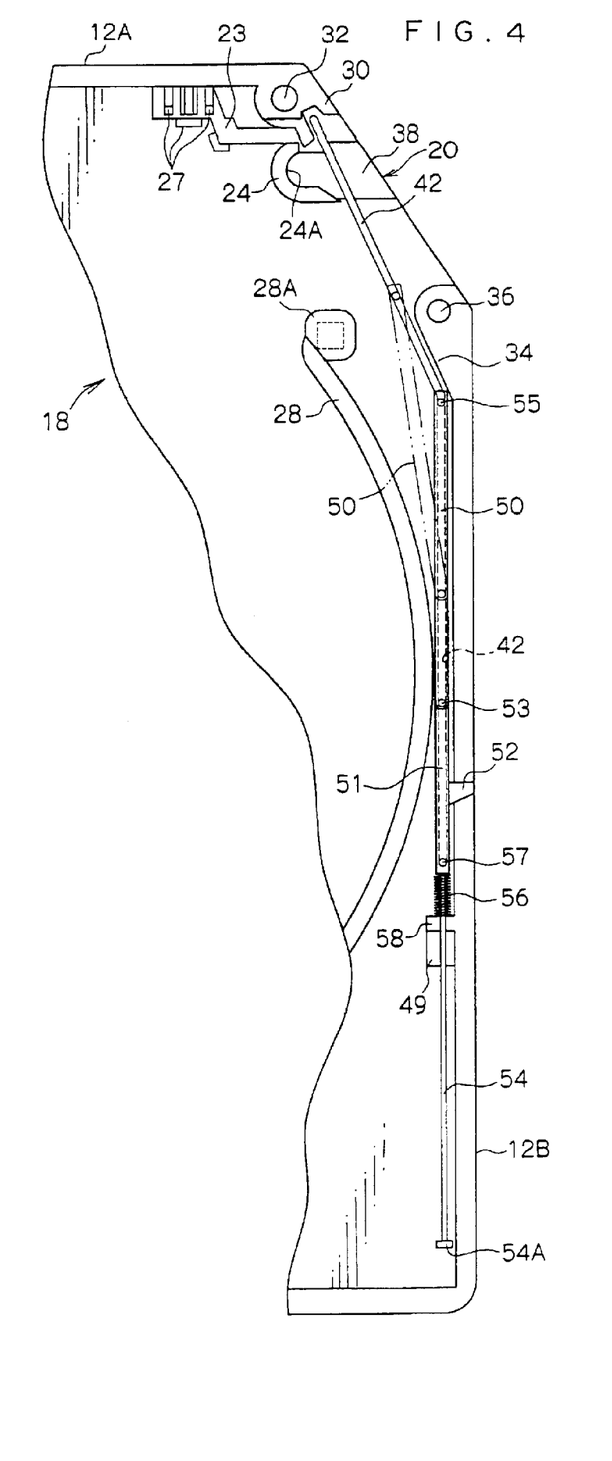
FIG. 4 is a schematic explanatory view showing a state when the door has opened the opening.
Figures 5A, 5B:
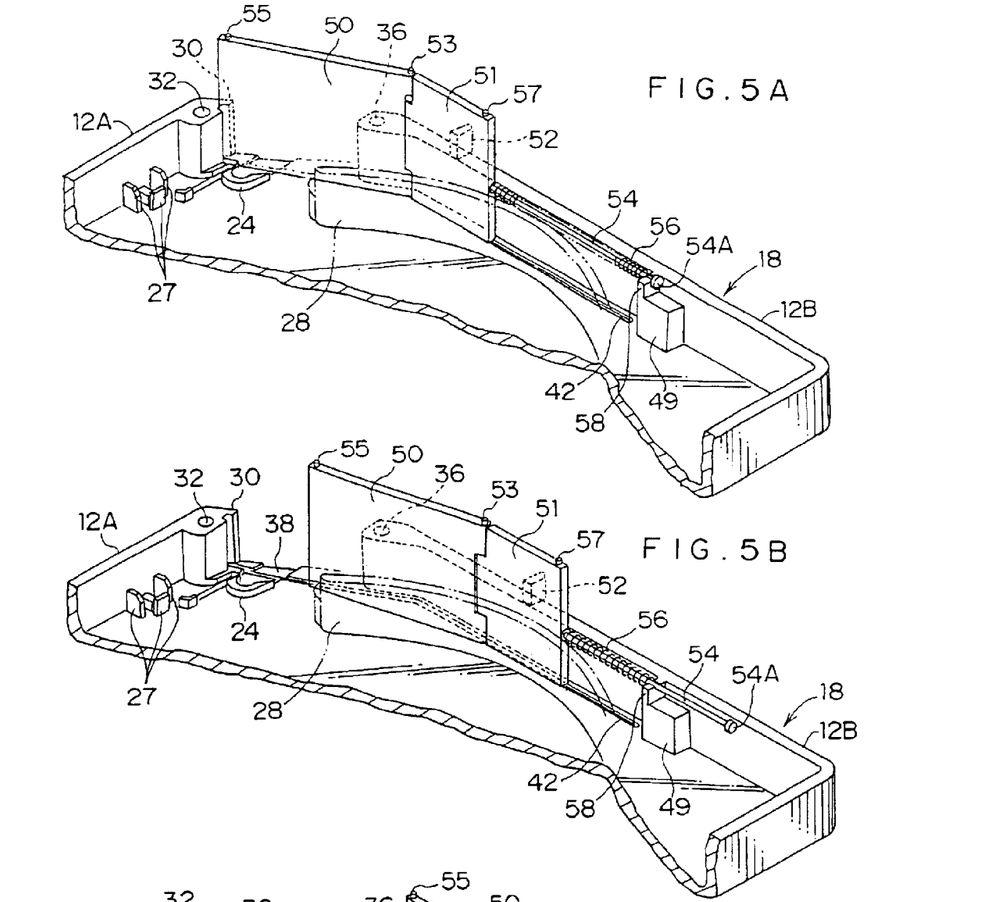
FIGS. 5A to 5C are each a schematic perspective view showing a stage of opening/closing of the door.
Figure 5C:
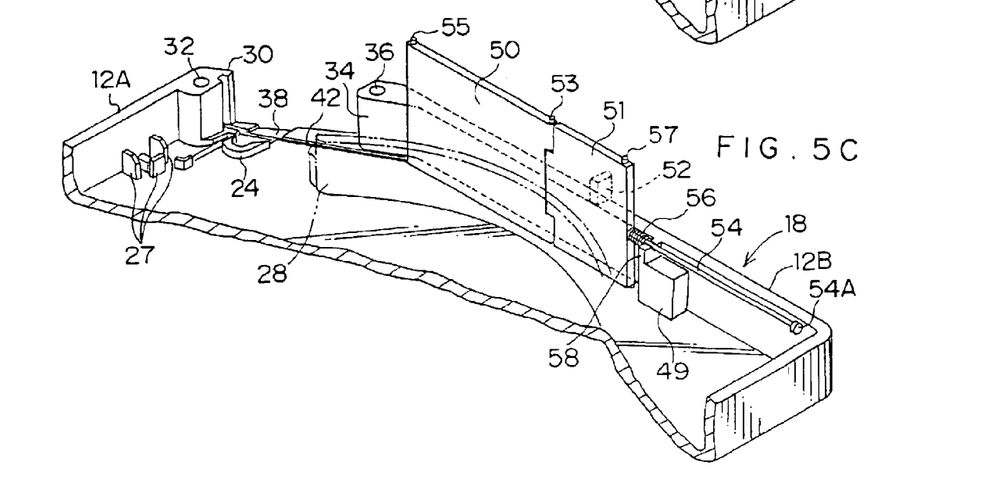

At an inner side of the opening 20 of the case 12, a pair of upper and lower pin retention portions 24 are provided for positioning and retaining the leader pin 22 in the case 12. The pin retention portions 24 have semi-tubular forms, as shown in FIGS. 3 to 5, and the two end portions of the leader pin 22 are held in recess portions 24A of the pin retention portions 24 in a state in which the leader pin 22 is standing thereat. Outer peripheral walls of the pin retention portions 24 are open at a magnetic tape T drawing out side thereof, to form exit/entry apertures through which the leader pin 22 is removed and inserted.

A base portion of a leaf spring 25 is inserted at a groove portion 23 (see FIGS. 3 and 4) and a spring retention portion 27, which is provided at an inner face of a front wall 12A (a portion of the peripheral walls 16A and 18A whose outer surface faces in the direction of arrow A). Thus, the leaf spring 25 is fixedly disposed in a vicinity of the pin retention portions 24. Distal end portions of a bifurcated form of the leaf spring 25 engage with upper and lower ends of the leader pin 22, and hold the leader pin 22 at the pin retention portions 24. The distal end portions of the leaf spring 25 are structured to resiliently deform appropriately when the leader pin 22 is removed or inserted at the pin retention portions 24, and to allow movements of the leader pin 22.

A gear aperture 26 is formed at a central portion of the lower case 18. The gear aperture 26 is for exposing an unillustrated reel gear of the reel 14 to the outside. The reel gear meshes with a driving gear of a drive device, and the reel 14 is driven to rotate inside the case 12. Further, the reel 14 is held by free play-restricting walls 28 so as not to rattle about. The free play-restricting walls 28 are provided projecting at portions of interior surfaces of the upper case 16 and the lower case 18, to serve as interior walls along a circular path which is coaxial with the gear aperture 26.

A hollow portion 28A is provided continuously with an end portion of the free play-restricting walls 28 in a vicinity of the opening 20. A hole is formed in the hollow portion 28A for regulation of position at the interior thereof. Further, a hollow portion 29 is provided separately from the free play-restricting walls 28 at an inner side of a front-left corner portion of the case 12. Another hole for regulation of position, which is a long hole, is formed in the hollow portion 29. The hollow portion 28A and the hollow portion 29 are disposed co-linearly along the direction of arrow B. Except for the end portion at which the hollow portion 28A is continuously provided, each of the free play-restricting walls 28 is provided continuously with the peripheral wall 16A or the peripheral wall 18A of the case 12. Accordingly, outer sides of the free play-restricting walls 28 and the space for disposing the reel 14 are set apart.

A memory board M is disposed at a rear-right portion of the lower case 18. The memory board M stores various kinds of information for each individual recording tape cartridge 10. A rear portion inside wall 18B is formed at an inclined face at a predetermined angle, the memory board M is supported by a support protrusion 19, so that the memory board M is inclinedly disposed at the predetermined angle.

The memory board M is inclined such that the memory board M can be detected at a drive device, which reads the memory board M from a lower face side, and a library apparatus, which reads the memory board M from a rear face side. (The library apparatus is an apparatus which accommodates a plurality of the recording tape cartridge 10 and automatically loads and removes the recording tape cartridge 10 at a drive device.) A write-protect portion (not shown), which sets whether recording to the recording tape cartridge 10 is allowed or disallowed, is provided at a rear-left portion of the lower case 18. An opening hole 17, through which an operation protrusion (not shown) for operating the write-protect portion protrudes, is piercingly provided through the rear-left portion of the lower case 18.

A pair of short upper and lower diagonal wall portions 30, which defines the front end portion of the opening 20, is provided at a right end portion of the front wall 12A of the case 12. The diagonal wall portions 30 are inflectedly formed along an opening wall of the opening 20. When the opening 20 is closed off, a distal end portion (front end portion) of a door 50, which is described later, enters into an inner side of the diagonal wall portions 30. Hence, the diagonal wall portions 30 act as an anti-dust wall such that a gap through which dust and the like could ingress does not occur. A pair of upper and lower screw bosses 32 are continuously provided at an inner side of the front wall 12A, at a vicinity of a left end of the diagonal wall portions 30.

A pair of upper and lower diagonal wall portions 34 is provided at an inner side of a front end portion of a right wall 12B of the case 12 (a portion of the peripheral walls 16A and 18A which faces in the direction of arrow B). The diagonal wall portions 34 correspond with an outer face of the door 50 in plan view when the opening 20 is closed (see FIG. 3). Front end faces of the diagonal wall portions 34 define a rear edge of the opening 20, and a pair of upper and lower screw bosses 36 are provided at a front end portion of the diagonal wall portions 34.

A slit 40 is formed in the right wall 12B of the case 12. The slit 40 has a predetermined length and serves as a window portion which communicates between the interior and exterior of the case 12. The slit 40 is for exposing an operation projection 52 of the later-described door 50. The slit 40 is formed by cutting away a front side lower portion of the peripheral wall 16A of the upper case 16 structuring the right wall 12B. The slit 40 also opens to the opening 20 side thereof. Thus, it is desirable if the slit 40 is formed with a portion of the peripheral wall 16A remaining at an upper side thereof, in order that rigidity of the case 12 can be maintained.

A recess portion 48 is formed in a left wall at a rearward side of the lower case 18. The recess portion 48 is recessed, with a three-sided box shape in cross-sectional view, toward the inside of the case 12 at a portion of the peripheral wall 18A, which does not include an upper end of the peripheral wall 18A, and is recessed upward from a lower face of the case 12 (i.e., a floor plate is cut away). The recess portion 48 is also formed in a right wall of the case 12. These recess portions 48 serve as, for example, engaging portions for engaging with pulling-in means of the drive device, with bottom surfaces of the recess portions 48 (surfaces that face downward) serving as reference surfaces for positioning in the drive device. The recess portion 48 at the right wall forms a hollow portion 49. An anchoring portion 58 for anchoring a coil spring 56, which is described later, is formed at an upper face of the hollow portion 49.

Further, a recess portion 46 is formed in a left wall at a rearward side of the recess portion 48. The recess portion 46 is recessed, with a three-sided box shape in cross-sectional view, toward the inside of the case 12 at a portion of the peripheral wall 18A, which does not include an upper end of the peripheral wall 18A, and is recessed upward from the lower face of the case 12 (i.e., the floor plate is cut away). The recess portion 46 serves as an engagement portion which is engaged by clasping means of the library apparatus. Because these recess portions 46 and 48 are provided, twisting strength of the case 12 (the lower case 18) is improved. Further still, a recess portion 44, which has a substantially trapezoid form in plan view, is formed at an upper face portion of a left wall of the upper case 16. The recess portion 44 serves as an engaging portion at which a retaining member (not shown) engages for canceling out rotational torque when the door 50 moves in an opening direction when the opening 20 is to be opened.

As shown in FIGS. 3 and 4, guide grooves 42 with predetermined depths (for example, approx. 1.0 mm) are formed at the upper case 16 and the lower case 18. The guide grooves 42 are inflectedly provided, substantially in a ">" shape in plan view, starting from an inner side of the diagonal wall portions 30 to a rear end of the diagonal wall portions 34 (herebelow, referred to as a front half of the guide grooves 42), and continue from the rear end of the diagonal wall portions 34 to a vicinity of the anchoring portion 58 (the hollow portion 49) (herebelow, referred to as a rear half of the guide grooves 42). The guide grooves 42 support protrusion portions 55 and 57 and upper and lower end portions of a coupling shaft 53 of the later-described door 50 and a guide plate 51 such that these protrusion portions 55 and 57 and vertical end portions of the coupling shaft 53 are sandwiched from two sides thereof, an inner face side and an outer face side. Recess portions 38 are formed at an inner face of the upper case 16 and an inner face of the lower case 18 in a vicinity of the opening 20, in correspondence with the exit/entry openings, such that the leader pin 22 can be easily drawn out from the pin retention portions 24.

The upper case 16 and the lower case 18 with the structures described above are fixed (joined) by unillustrated screws which are screwed from the lower side into each of the screw bosses 32 and 36, which are located in vicinities of edge portions of the opening 20. Accordingly, corner portions at both ends of the opening 20, which are defined by free ends of the diagonal wall portions 30 (the front wall 12A) and the diagonal wall portions 34 (the right wall 12B) and which tend to be severely affected when impacted against a floor or the like by a fall, are securely fixed. Thus, even if the case 12 is dropped, this structure will not be deformed by the overall weight of the recording tape cartridge 10 or buckled so as to cause mispositioning. Matching surfaces of the peripheral walls 16A and 18A (at corner portions at both ends of the opening 20) may be fixed by welding, but fixing with screws is more preferable in consideration of dismantling and recycling.

The opening 20 is opened and closed by the door 50, which serves as a covering member. A front end portion of the guide plate 51, which serves as an operating member from which the operation projection 52 protrudes (and as the covering member), is pivotably joined to a rear end portion of the door 50 by the coupling shaft 53, which serves as a hinge. Specifically, the door 50 and the guide plate 51 are formed in flat plate shapes with respective predetermined sizes. Cylindrical axis portions are respectively provided at rear end upper and lower portions of the door 50 and a front end central portion of the guide plate 51. The cylindrical axis portion of the guide plate 51 is disposed between the cylindrical axis portions of the door 50. The coupling shaft 53 passes through the interiors of these cylindrical axis portions, and thus the door 50 and guide plate 51 are structured so as to be rotatable relative to one another.

The protrusion portions 55 are protrudingly provided at upper and lower end faces at a distal end portion side (front end portion side) of the door 50. The protrusion portions 55 abut against guide faces of the guide grooves 42 (mutually opposing guide wall inside faces), and against inner faces of the upper case 16 and the lower case 18 along the guide grooves 42. Thus, the protrusion portions 55 guide the door 50 in a direction of opening/closing the opening 20. The protrusion portions 57 are protrudingly provided at upper and lower end faces of a rear end portion side of the guide plate 51, and guide the guide plate 51 in the direction of opening/closing the opening 20.

The vertical end portions of the coupling shaft 53 also protrude beyond the upper and lower end faces of the door 50 and the guide plate 51. The vertical end portions of the coupling shaft 53 abut against the guide faces of the guide grooves 42 (the mutually opposing guide wall inside faces) and the inner faces of the upper case 16 and the lower case 18 along the guide grooves 42. Thus, the vertical end portions of the coupling shaft 53 guide the door 50 and the guide plate 51 in the direction of opening/closing the opening 20. Accordingly, heights of the vertical end portions of the coupling shaft 53, which protrude beyond the upper and lower end faces of the door 50 and the guide plate 51, and of the protrusion portions 55 and 57 are formed to be the same or slightly more than the depths of the guide grooves 42.

The operation projection 52, which protrudes at the outer face of the guide plate 51, is exposed to the outer side of the case 12 through the slit 40. In a state in which the opening 20 is closed, the operation projection 52 is disposed to be slightly separated from a rear end of the screw bosses 36, and is set to be operable through the portion of the slit 40 which opens frontward. Further, in a state in which the opening 20 is open, the operation projection 52 is disposed to be slightly separated from a rear edge of the slit 40. At this time, the protrusion portions 57 of the guide plate 51 abut at a rear end portion of the guide grooves 42 (see FIG. 4).

A shaft 54 with a predetermined length and a predetermined diameter is protrudingly provided at a rear end face of the guide plate 51. The shaft 54 is insertingly fitted into the coil spring 56, which serves as an urging member urging the door 50 and the guide plate 51 in the direction of closing the opening 20. Further, a large diameter portion 54A is formed at the rear end portion of the shaft 54 for preventing detachment of the coil spring 56 therefrom.

Correspondingly, the anchoring portion 58 is formed at an upper face of the hollow portion 49 of the lower case 18. The anchoring portion 58 is recessed in a circular arc shape with a diameter slightly larger than the diameter of the shaft 54 and forms a substantial "U" shape in front view. When the door 50 and guide plate 51 are assembled into the case 12, the shaft 54 is moved into the anchoring portion 58, such that the portion of the shaft 54 is supported by the anchoring portion 58, between a rear end of the coil spring 56 and the large diameter portion 54A. Hence, the between a rear end of the coil spring 56 and the large diameter portion 54A between a rear end of the coil spring 56 and the large diameter portion 54A door 50 and the guide plate 51 are urged in the direction of closing the opening 20 by urging force of the coil spring 56.

Specifically, the rear end of the coil spring 56 is anchored at a front face of the anchoring portion 58, and the shaft 54 is supported at an upper face of the anchoring portion 58 (i.e., on the face which is recessed in the substantial "U" shape. Hence, as shown in FIG. 3, the door 50 and the guide plate 51 are in a state of being continuously urged in the direction of closing the opening 20. With this structure, when the opening 20 is opened, as shown in FIG. 4, the door 50 and guide plate 51 are moved toward the rear side against the urging force of the coil spring 56, and the shaft 54 slides while remaining in the state in which the shaft 54 is supported at the upper face of the anchoring portion 58.

The door 50 of the structure described above closes the opening 20 in a state in which the distal end portion (front end portion) of the door 50 is entered into the inner side of the diagonal wall portions 30. When a force pushing relatively toward a rearward direction (a direction opposite to the direction of arrow A) is applied to the operation projection 52 by a drive device side opening/closing member (not shown), the pushing force is applied to the door 50 via the guide plate 51, and the door 50 slidingly moves substantially rearward along the guide grooves 42. When an outer face of the distal end portion (front end portion) of the door 50 reaches a rearward side relative to the screw bosses 36, the opening 20 is completely open.

That is, the door 50 is pivotably coupled with the guide plate 51 by the cylindrical axis portions and the coupling shaft 53, and the door 50 is rotatable relative to the guide plate 51 about the coupling shaft 53. Therefore, a wide angle θ between the door 50 and the guide plate 51, which slidingly moves only in a front-rear direction along the rear half of the guide grooves 42 (see FIG. 3) is freely variable, and the protrusion portions 55 are guided at the front half of the guide grooves 42. Therefore, the door 50 is capable of sliding to move in a substantially front-rear direction. Consequently, the door 50 can excellently open and close the opening 20 even though the opening 20 has been formed by cutting away, in an oblique manner, the corner portion of the case 12.

Now, in the present embodiment, the opening 20 can be opened and closed by a covering member which is formed by two flat plates, the door 50 and the guide plate 51. However, it is sufficient that the covering member is structured by a plurality of flat plates which are pivotably coupled to one another. Further, as described above, the slit 40 for exposing the operation projection 52 communicates between the interior and exterior of the case 12. Because the slit 40 is in a state of being continuously closed by the screw bosses 36, the door 50 and guide plate 51 and the free play-restricting walls 28, which serve as an interior wall, adherence of dust and the like to the magnetic tape T wound on the reel 14 is avoided.

Next, operation of the present embodiment will be described. In the recording tape cartridge 10 having the structure described above, the opening 20 is closed by the door 50 when the recording tape cartridge 10 is not in use (during storage, during transportation, and the like). Specifically, as shown in FIGS. 3 and 5A, the door 50 is continuously urged in the closing direction of the opening 20 by the urging force of the coil spring 56, and the door 50 closes the opening 20 in the state in which the distal end portion (front end portion) of the door 50 is entered into the inner side of the diagonal wall portions 30.

In contrast, when the magnetic tape T is to be used, the recording tape cartridge 10 is loaded into a drive device along the direction of arrow A. In accordance with this loading, the opening/closing member (not shown), which structures opening/closing means of the drive device, advances into the slit 40 which opens frontward, and engages with the operation projection 52 which protrudes at the guide plate 51. In this state, as the recording tape cartridge 10 (the case 12) is pushed in further, the urging force of the coil spring 56 is opposed by a force of pushing in, and the opening/closing member moves the operation projection 52 rearward (that is, relatively rearward with respect to the case 12 which is being loaded in the direction of arrow A).

Accordingly, as shown in FIG. 5B, the protrusion portions 55 of the door 50 which is pivotably coupled to the guide plate 51 by the coupling shaft 53 (the operation projection 52 is protrudingly provided at the guide plate 51), are guided by the front half of the guide grooves 42, and the door 50 is pulled by the guide plate 51 and moves toward the rear side. At this time, the vertical end portions of the coupling shaft 53 and the protrusion portions 57 of the guide plate 51 are guided by the rear half of the guide grooves 42, and the shaft 54 slides towards the rear side while being supported at the anchoring portion 58.

When the case 12 (the recording tape cartridge 10) is loaded to a predetermined depth in the drive device, the opening 20 is completely open, as shown in FIGS. 4 and 5C. At this time, rearward movement of the door 50 is limited by the protrusion portions 57 of the guide plate 51 abutting at the rear end portion of the guide grooves 42.

In the state in which the opening 20 has been opened in this manner and the recording tape cartridge 10 has been positioned within the drive device, the drawing-out means of the drive device advances into the case 12 through the opened opening 20. The drawing-out means takes out the leader pin 22, which had been positioned and retained at the pin retention portions 24, and accommodates the leader pin 22 at the unillustrated winding reel. Then, the winding reel and the reel 14 are driven to rotate contemporaneously, and the magnetic tape T is wound around the winding reel while being sequentially drawn out from the case 12. Recording and/or replaying of information on the magnetic tape T is carried out by a recording/replaying head or the like which is disposed along a predetermined tape path.

Subsequently, when the magnetic tape T has been wound back to the reel 14 again and the recording tape cartridge 10 is to be ejected from the drive device, the state of positioning of the recording tape cartridge 10 is released and the recording tape cartridge 10 is moved in the direction opposite to the direction of arrow A by the urging force of the coil spring 56 and/or by an unillustrated ejection mechanism. Hence, the protrusion portions 55 and 57 of the door 50 and the guide plate 51 and the vertical end portions of the coupling shaft 53 are guided at the guide grooves 42 while the door 50 and the guide plate 51 are moved in the closing direction of the opening 20 by the urging force of the coil spring 56. Consequently, the opening 20 is completely closed and the recording tape cartridge 10 returns to the original state.

Here, because the opening 20 includes a cut away portion at a front-right (in a direction of loading to a drive device) corner portion of the rectangular case 12, an opening face of the opening 20 faces in the direction of arrow A and in the direction of arrow B (i.e., the opening face is angled with respect to the direction of arrow A). This means that the drawing-out means of the drive device can gain access to the leader pin 22 from a front face side which faces the direction of arrow A, of the case 12, and it is not required that the drawing-out means gains access from an outer side (the arrow B side) relative to the peripheral walls (side walls) 16A and 18A at the arrow B side. Consequently, in this drive device, a path for drawing out the magnetic tape T can be made as short as possible, and the drawing-out means does not require a drive mechanism for turning in from the arrow B side of the case 12. Thus, reductions in size and in costs can be expected.

Further, when the length of the path for drawing out the magnetic tape T is minimized, a running path of the magnetic tape T will inevitably be shortened, too. As a result, contact abrasion of the magnetic tape T with tape guides (for example, rotatably supported rollers and the like) can be reduced. Furthermore, because the opening 20 is formed by cutting away the corner portion of the case 12 and faces in the direction of arrow A and in the direction of arrow B, a range of directions of access to the leader pin 22 by the drawing-out means (by hooks thereof or the like) is widened. Consequently, positions at which the leader pin 22 can be disposed in the case 12 are broadened. Further, according to the structure of the present invention, there is substantially no possibility that the operation path of the door 50 interferes with positions at which the leader pin 22 can be disposed in practice. Therefore, a degree of freedom of design of the drive device is further improved.

Specifically, because the door 50 is coupled with the guide plate 51 at which the operation projection 52 is projectingly provided by the coupling shaft 53 and the guide plate 51 and the door 50 are rotatable relative to one another, the door 50 and the guide plate 51 can move so as to swing at an outer side of the reel 14 and the pin retention portions 24 (and the leader pin 22), for opening and closing the opening 20, while the vertical end portions of the coupling shaft 53 and the protrusion portions 55 and 57 are guided at the guide grooves 42, which are inflectedly formed substantially in the ">" shape in plan view.

Consequently, a movement path of the door 50 does not interfere with the pin retention portions 24 (and the leader pin 22), the reel 14 and the like in the case 12, and the door 50 can be structured in little space. Thus, space in the case 12 can be used more efficiently. As a result, a reduction in size of the recording tape cartridge 10 can be achieved, and a space for accommodation of the recording tape cartridge 10 in the drive device is smaller. Hence, the drive device can be made smaller and space inside the drive device can be used more efficiently.

Further still, because the door 50 and the guide plate 51 are formed in flat plate forms, the door 50 and guide plate 51 have an advantage compared to a door which is formed in a substantially circular arc shape in plan view, in that the door 50 and guide plate 51 can be assembled with greater accuracy. That is, with a door which was formed in a substantially circular arc form in plan view, a difference with respect to the guide grooves 42 is likely to occur due to variations in curvature when the door was molded, and thus it would be necessary to make the width of the guide grooves 42 slightly larger. As a result, the door would be more likely to rattle. However, with the flat plate-form door 50 and guide plate 51, there is less likely to occur a difference with respect to the guide grooves 42. Therefore, there is no need for the width of the guide grooves 42 to be made wider, and the door 50 and the guide plate 51 will not rattle.

Further again, the door 50 is a separate member from the leader pin 22 that is drawn out from the case 12 and, with this structure, the door 50 cannot be taken out from the case 12 in an assembled state. Thus, the door 50 will not be removed from the case 12 by an impact when the recording tape cartridge 10 is dropped or the like. Moreover, the leader pin 22 is accommodated in the case 12 in a firmly shut state when the opening 20 is closed by the door 50, at a time of non-use of the magnetic tape T. Thus, the leader pin 22 is less likely to become damaged or soiled. Consequently, drawing out and running of the magnetic tape T in the drive device will not be affected, and the magnetic tape T itself will not be damaged.

Yet further, because the opening/closing member of the drive device may be fixedly disposed, as long as the opening/closing member is capable of advancing into the slit 40 from the front side and engageable with the operation projection 52 of the door 50, structure thereof can be simple. Also, because the door 50 closes the opening 20 due to the urging force of the coil spring 56, there is no need for a drive device side mechanism for driving the door 50 in the direction of closing the opening 20. Therefore, structure of the opening/closing means (opening/closing member) of the drive device can be even simpler.

Thus, with the recording tape cartridge 10 relating to the present embodiment, the opening 20, which has a structure of minimizing the length of the drawing-out path of the magnetic tape T, can be opened and closed without interfering with the reel 14 and the leader pin 22, by the door 50, which reduces the size of the accommodation space for the recording tape cartridge 10 in the drive device. Further, in the present embodiment, the opening/closing means (including an opening/closing member), which operates the door 50 and opens and closes the opening 20, can be given a simple structure.

As described hereabove, according to the present invention, because an opening aperture is provided by cutting away a corner portion of a case at a side of loading the case into a drive device, an opening face of this opening aperture can be made to face toward the drive device, drive device side drawing-out means can be advanced into the case from frontward thereof, and a drawing-out path of a recording tape can be made as short as possible. Therefore, a complicated mechanism for turning and guiding the recording tape is not required at the drive device, and a compact drive device with low production costs can be designed.

Moreover, because a covering member is structured by a plurality of flat plates coupled by hinges, the covering member can be slid along an inflected guide groove constituted of a groove along the opening aperture and a groove along the loading direction of the drive device connected therewith. That is, it is possible to slide this covering member at an angle with respect to the drive device loading direction, and thus the opening aperture provided at the corner portion can be opened and closed.

What is claimed is:

1. A recording tape cartridge comprising:
a substantially rectangular case rotatably accommodating a single reel on which recording tape is wound;
an opening aperture for drawing out a leader member attached to an end portion of the recording tape, the opening aperture including a cut away portion at a corner portion, of the case,
at a front side of the case in a direction of loading to a drive device;
an inflected guide groove formed at an inner face of the case; and
a covering member including a plurality of plate pieces which are hingedly coupled and guided along the guide groove, the covering member sliding for opening and closing the opening aperture.

2. The recording tape cartridge of claim 1, wherein the guide groove comprises a front half portion which extends along the opening aperture at an angle with respect to the loading direction and a rear half portion which extends along the loading direction.

3. The recording tape cartridge of claim 2, wherein the rear half portion of the guide groove is longer than the front half portion.

4. The recording tape cartridge of claim 2, wherein the covering member comprises a door with a length substantially the same as a length of the front half portion of the guide groove, and a guide plate which is hingedly coupled with the door.

5. The recording tape cartridge of claim 4, wherein, when the covering member is at a closed position for closing the opening aperture, the door is disposed at the front half portion of the guide groove and the guide plate is disposed at the rear half portion of the guide groove.

6. The recording tape cartridge of claim 4, wherein, when the covering member is at an open position for opening the opening aperture, the door and the guide plate are both disposed at the rear half portion of the guide groove.

7. The recording tape cartridge of claim 4, wherein the covering member is urged in a direction of closing the opening aperture by urging means connected to the guide plate.

8. The recording tape cartridge of claim 7, wherein the urging means comprises a spring.

9. The recording tape cartridge of claim 1, wherein the guide groove is formed at at least one of upper and lower inner faces of the case.

10. The recording tape cartridge of claim 9, wherein the covering member is engaged with the guide groove via a plurality of protruding portions provided at a vertical end portion of the covering member.

11. The recording tape cartridge of claim 4, further comprising a protrusion toward an exterior of the case, which protrusion is formed at the guide plate, the covering member being opened and closed by the protrusion.

12. The recording tape cartridge of claim 4, wherein at least one of the door and the guide plate is formed by a plurality of hingedly coupled plate pieces.

13. The recording tape cartridge of claim 6, wherein, when the covering member is at the open position for opening the opening aperture, an end portion of the guide plate, at a side thereof which is distant from the door, abuts at a rear end portion of the rear half portion of the guide groove for limiting movement of the covering member.

14. A recording tape cartridge comprising:
a substantially rectangular case rotatably accommodating a single reel on which recording tape is wound;
an opening aperture for drawing out a leader member attached to an end portion of the recording tape, the opening aperture including a cut away portion at a corner portion, of the case, at a front side of the case in a direction of loading to a drive device;
a covering member including a plurality of plate pieces which are hingedly coupled, the covering member sliding for opening and closing the opening aperture; and
guide means for guiding the covering member when the covering member is sliding,
wherein the covering member includes at least a door capable of closing the opening aperture and a guide plate which is hingedly coupled with the door, and
wherein the covering member and the guide means are configured so that the covering member remains inside of the rectangular case during closing and opening of the opening aperture.

15. The recording tape cartridge of claim 14, wherein the guide means comprises an inflected guide groove formed at at least one of upper and lower inner faces of the case.

16. The recording tape cartridge of claim 15, wherein the guide groove comprises a front half portion which extends along the opening aperture at an angle with respect to the loading direction and a rear half portion which extends along the loading direction, and a length of the front half portion is substantially the same as a length of the door.

17. The recording tape cartridge of claim 16, wherein, when the covering member is at a closed position for closing the opening aperture, the door is disposed at the front half portion of the guide groove and the guide plate is disposed at the rear half portion of the guide groove.

18. The recording tape cartridge of claim 16, wherein, when the covering member is at an open position for opening the opening aperture, the door and the guide plate are both disposed at the rear half portion of the guide groove.

19. The recording tape cartridge of claim 18, wherein, when the covering member is at the open position for opening the opening aperture, an end portion of the guide plate, at a side thereof which is distant from the door, abuts at a rear end portion of the rear half portion of the guide groove for limiting movement of the covering member.

20. A recording tape cartridge comprising:

a substantially rectangular case rotatably accommodating a single reel on which recording tape is wound;

an opening aperture for drawing out a leader member attached to an end portion of the recording tape, the opening aperture including a cut away portion at a corner portion, of the case, at a front side of the case in a direction of loading to a drive device;

a covering member including a plurality of plate pieces which are hingedly coupled, the covering member sliding for opening and closing the opening aperture; and guide means for guiding the covering member when the covering member is sliding, wherein the covering member includes at least a door capable of closing the opening aperture and a guide plate which is hingedly coupled with the door, and wherein the guide means comprises an inflected guide groove formed at at least one of upper and lower inner faces of the case.

21. The recording tape cartridge of claim 20, wherein the guide groove comprises a front half portion which extends along the opening aperture at an angle with respect to the loading direction and a rear half portion which extends along the loading direction, and a length of the front half portion is substantially the same as a length of the door.

22. The recording tape cartridge of claim 21, wherein, when the covering member is at a closed position for closing the opening aperture, the door is disposed at the front half portion of the guide groove and the guide plate is disposed at the rear half portion of the guide groove.

23. The recording tape cartridge of claim 21, wherein, when the covering member is at an open position for opening the opening aperture, the door and the guide plate are both disposed at the rear half portion of the guide groove.

24. The recording tape cartridge of claim 23, wherein, when the covering member is at the open position for opening the opening aperture, an end portion of the guide plate, at a side thereof which is distant from the door, abuts at a rear end portion of the rear half portion of the guide groove for limiting movement of the covering member.

* * * * *